United States Patent Office 2,865,466
Patented Dec. 23, 1958

2,865,466

GAS FILTER AND ADHESIVE THEREFOR

Stanley H. Frohmader, Madison, Wis., assignor to Research Products Corporation, Madison, Wis., a corporation of Wisconsin No Drawing. Application March 7, 1955
Serial No. 492,753

13 Claims. (Cl. 183—44)

This invention relates to gas filters and particularly to such filters having an improved adhesive on the surfaces thereof. The invention also relates to the improved filter adhesive. The filter of the invention is suitable for filtering gases of all kinds, but its principal use is for filtering air and for convenience only this latter use will be referred to hereinafter.

Filters of the impingement type are well known, consisting of a body or base of interstitial filtering material composed of webs or strands which act as baffles in the path of the air which is being filtered. The pores of the interstitial body are larger than the airborne particles. The baffles are coated with a tacky adhesive and the particles are removed from the air by impinging upon the adhesive-coated surfaces of the baffles and adhering thereto.

In filters of this character, serious problems are present in providing adhesive-coated surfaces which have the desired properties. The adhesive should be sufficiently fluid that it is readily applied to the filter base by a convenient method as spraying or dipping. On the other hand, it should be sufficiently plastic that it does not drip from the filter at the highest temperature and highest humidity of use. Also, it should be sticky or tacky and it should readily wet the air-borne particles, these latter properties both being essential for the realization of a high degree of acceptance or attachment for the particles. As another aspect of the problem, filters of the so-called permanent type are being used to an increasing extent, in comparison with those of the disposable type which are discarded after they have become dust-laden. The permanent type are cleaned, recoated with adhesive and returned to use. For the cleaning operation, it is desirable that the dust-laden adhesive be removed readily from the filter base by washing with water.

A substance which has been in common use as an adhesive is hydrocarbon oil of a viscous consistency, such as a viscous lubricating mineral oil. Such an adhesive has the disadvantage that it tends to drip from the filter. If an oil of relatively high viscosity is used to avoid dripping, it becomes difficult to apply the oil uniformly to the filter surfaces. Also, such an oil is hydrophobic and cannot be washed from the filter with water, but requires the use of steam or an organic solvent such as gasoline, carbon tetrachloride, etc. Such solvents are flammable or otherwise unsafe for use by the ordinary home owner.

It is the object of the invention to provide a filter having an adhesive which possesses all of the desirable properties which have been mentioned, namely, it can be applied readily by spraying or dipping; it exhibits little or no tendency to drip from the filter, even at elevated temperatures; it is tacky and it wets the particles, whereby it exhibits a high degree of acceptance for the dust; and it is readily washed from the filter by the simple operation of flowing water upon the filter. Stated briefly, the objects are accomplished by providing an adhesive composed of a self-emulsifiable mineral oil which is thickened by means of a thickener which imparts a non-dripping character to the adhesive. For application to the filter base, the adhesive is emulsified with water, and the emulsion so formed, which has a lower viscosity than the adhesive itself, is applied by spraying or dipping. Water evaporates from the emulsion, leaving a film of tacky non-dripping adhesive on the surfaces of the filter base.

Self-emulsifiable oils are well known, as is shown by the following statement quoted from the book entitled "Surface Activity" by J. L. Moilliet and B. Collie, published in 1951 by D. Van Nostrand, Company, Inc. (page 180):

"It is frequently desired to make oil-in-water emulsions 'on the spot' by simply mixing an oil with water, without the use of special machinery, and preferably without having to measure out a special emulsifying agent. To meet this requirement, self-emulsifiable oils have been developed which form fine emulsions (which are frequently at or beyond the limit of resolution in a light microscope), apparently spontaneously, when they are mixed with water."

Self-emulsifiable oils are also known as "soluble oils," as is shown by the following statement quoted from U. S. Patent No. 2,039,377 (column 1, lines 4 to 11):

"Soluble oils are oils containing dissolved emulsifying agents so that when they are poured into water they immediately form stable emulsions without necessity of special dispersing means, which are suitable for use as cutting oils, drawing oils, textile or wool oils, tree sprays, lubricants, coal sprays, antirust oils or any other use for which soluble oils are usually employed."

A self-emulsifiable oil does not require the presence of a separate emulsifier, as is disclosed in United States Patent No. 2,653,909, which describes the making of such an oil by oxidizing and neutralizing a solvent extracted refined lubricating oil.

The soluble or self-emulsifiable mineral oils which are suitable for the purposes of the invention are the self-emulsifiable oils which are substantially odorless and non-volatile and which have as their base oils which are liquid at any temperature in the range from $-20°$ C. to $60°$ C. and which are essentially hydrocarbons occurring in mineral oil, their distillates and their cracked or polymerized derivatives, an example of the last being polybutene. In accordance with known procedure, the oil base is modified or has an emulsifier incorporated with it to form a self-emulsifiable oil with which an emulsion is readily formed simply by bringing water into contact with it. The oil base defined in the foregoing will herein be called "mineral oil," and self-emulsifiable oil containing such base will herein, in the specification and claims, be called "self-emulsifiable mineral oil."

The self-emulsifiable mineral oils are generally viscous liquids and, in order to prevent dripping, the oil is thickened to a plastic, non-dripping condition by dispersing a suitable thickener therein. A thickener is selected which is oleophilic in character, by which is meant that the thickener has a strong affinity for the oil such that when an emulsion is made with the adhesive composition and water the thickener does not leave the oil phase. A large number of thickeners are suitable for the purpose, including hydrogenated castor oil, 12-hydroxystearic acid, the monoglycerides and diglycerides of 12-hydroxystearic acid, polyethylene, microcrystalline wax, estersil (which will be described hereinafter), 1,2 distearamidoethane (sold under the trade-mark "Acrawax C"), and many soaps including the metal esters of fatty acids in which the metals include the following: lithium, sodium, potassium, barium, calcium and aluminum. With different thickeners, different characters of thickened composition are formed, as truly plastic, pseudoplastic, thixotropic, viscous; and all of these are embraced herein within the term "plastic."

The hydrogenated castor oil which is suitable as thickener is the well known product of that name which is composed principally of 12-hydroxystearin, which is produced by the catalytic hydrogenation of natural castor oil. Natural castor oil is composed principally of the glyceride of ricinoleic acid having a melting point of 63° C. or higher, and any synthetic substance similar to this may also be used as the base for the hydrogenated product. The polyethylenes which are suitable are those polymers of ethylene having a softening point of 90° C. or higher, as determined by the A. S. T. M. specified test D29–42T. It has been stated that microcrystalline wax is suitable for use as a thickener. Some of the available ozokerites are very similar to microcrystalline wax and these may be used as the thickener also. The estersil which is suitable as a thickener is the substance called by that name and described in U. S. Patent No. 2,657,149, said substance comprising a super-colloidal substrate coated with —OR groups, the substrate having a surface of silica and having a specific surface area of from 1 to 900 square meters per gram, the coating of —OR groups being chemically bound to said silica, R being a hydrocarbon radical of from 2 to 18 carbon atoms wherein the carbon atom attached to oxygen is also attached to hydrogen. The use of estersil as a thickener for a hydrocarbon oil is described in U. S. Patent No. 2,676,148. The substance which is described in said patent and in the foregoing is that which is embraced herein in the specification and claims by the term "estersil."

Some of the thickeners are soluble in the self-emulsifiable mineral oil at an elevated temperature and are insoluble at room temperature (20° C.) and are caused to be effective for the thickening function by bringing them into solution in the self-emulsifiable mineral oil at an elevated temperature, usually above the melting point of the thickener, and then cooling the composition to a lower temperature at which the thickener is insoluble in the oil, whereby the solution is converted to a dispersion of the thickener in the oil. This is true of a number of the thickeners including hydrogenated castor oil, 12-hydroxystearic acid and the monoglycerides and diglycerides of 12-hydroxystearic acid, polyethylene, microcrystalline wax, 1, 2 distearamidoethane and metal soaps. With this group of thickeners, a rapid cooling operation is satisfactory for bringing about the thickening effect and producing a plastic product of highly homogeneous consistency from which the oil does not bleed. Such a method of cooling is described in U. S. Patent No. 2,627,938, which describes the thickening of mineral oil by means of polyethylene.

Some of the thickeners of this group are also effective when a slow cooling procedure is used, such thickeners including hydrogenated castor oil, 12-hydroxystearic acid, and the monoglycerides and diglycerides of 12-hydroxystearic acid. With these latter substances, milling the mixture under a high shearing force improves the thickening effect and results in a uniform, homogeneous dispersion of thickener in oil from which the oil does not bleed. The shearing operation is preferably performed after the cooling operation.

With some of the thickeners, such as estersil, the thickening effect is produced by mixing the thickener with the self-emulsifiable oil at room temperature or other desired temperature and subjecting the mixture to milling under a high shearing force to thoroughly disperse the thickener in the oil. Such procedure is described in U. S. Patent No. 2,676,148.

The amount of thickener which may be used is not critical. A certain minimum amount is required in order to produce the desired plastic condition whereby the adhesive does not drip from the filter. More than this may be used if desired, cost of production usually being the determining factor in this respect. The amount which is required depends upon the particular self-emulsifiable mineral oil and the particular thickener which is used, that is, it depends upon the particular combination of self-emulsifiable mineral oil and thickener which is used. Suitable amounts for the thickener are best exemplified in the specific examples of adhesive composition and method for making them given in the following description.

The adhesive is applied to the filter base in the form of an emulsion with water, because in this form it is readily applied by spraying or dipping. The emulsion has a lower viscosity than the adhesive itself and is much better adapted for application by spraying or dipping. The proportions of water in the emulsion may be varied. As the proportion of water is increased, the inversion point is reached at which the emulsion changes from the water-in-oil type to the oil-in-water type, and this change is accompanied by a sharp and pronounced lowering of the viscosity. This phenomenon is reversible and as water is removed from the oil-in-water emulsion, as by evaporation, the inversion point is reached at which the emulsion inverts to the water-in-oil type, which is accompanied by a pronounced increase in viscosity. It is generally desired to use an amount of water sufficient to produce an oil-in-water emulsion, and a much larger amount may be used if desired. An amount of water equal to 90 percent, based on the weight of the emulsion, has been used with satisfactory results. The inversion point occurs at different proportions of water with different adhesive compositions, and with the composition of Example 1 described hereinafter it occurs at approximately 35 percent of water, based on the weight of the emulsion.

Application in the form of an emulsion does not increase the tendency toward dripping. The filter base with the emulsion coating on the surfaces thereof is exposed to a drying atmosphere, which may be the ordinary room or outside atmosphere, and the water quickly evaporates into the atmosphere from the films of emulsion on the filter surfaces. The initial evaporation causes the formation of a relatively high viscosity skin at the exposed surface of the film and this skin immobilizes the film and inhibits dripping. The formation of such skin is more pronounced in a case in which the initial evaporation of water causes the surface portion of the emulsion to pass through the inversion point to a water-in-oil emulsion with pronounced increase in viscosity. At any rate, there is no dripping of the emulsion from the filter surfaces after the initial evaporation of water from the emulsion. The evaporation continues until the film of adhesive is relatively water-free, in which condition it is tacky and exhibits high dust-catching ability and no tendency to drip from the filter even at temperatures up to 66° C. (150° F.) which is as high as is normally encountered in use. The application of the adhesive in the form of an emulsion, and the capability of the adhesive to be so applied, are considered to be advantageous features of the present invention. The method of forming the emulsion and applying it to the filter will be described in detail in connection with the examples.

After the filter has accumulated dust in service, the dust-laden adhesive is washed from the filter base by the simple operation of flowing water, either warm or cold, upon the filter. The thickened soluble mineral oil adhesive readily forms an emulsion upon contact of the water therewith, which emulsion is readily removed by the flowing water. The capability of the adhesive of the invention of being removed by such simple contact by water is considered to be an advantageous feature of the present invention.

Several examples are given herein illustrating the composition of the adhesive and the method of making it and applying it to the filter base. These examples are by way of illustration and variations in composition and method of preparation and application may be made within the spirit of the invention. The viscosity of a number of the examples is given in poises. Such viscosity is determined with the Brookfield rotational viscosimeter operating at one R. P. M. Some of the compositions, as the thixotropic product of Example 1, exhibit the phenomenon of false-body and the viscosity of compositions having false-body is herein called "apparent viscosity."

*Example 1*

| | Parts by weight |
|---|---|
| Hydrogenated castor oil | 2 |
| Soluble mineral oil | 98 |

The hydrogenated castor oil is that which has been fully hydrogenated to 12 hydroxystearin. The soluble mineral oil is that sold by the Standard Oil Company of Indiana under the trademark "Superla." The hydrogenated castor oil and soluble mineral oil are agitated together in a steam-jacketed vessel at a temperature of 95° C. to 100° C. until the hydrogenated castor oil is dissolved. The composition is flowed in the form of a thin layer upon the exterior surface of a revolving hollow metal cooling roll, the interior of which is cooled by cold water. The temperature of the composition flowing to the roll is maintained at approximately 95° C. Cooling occurs in about 1 to 2 seconds, and the cooled composition is scraped from the roll at a temperature of approximately 18° C. The resulting composition is thixotropic and while as it leaves the roll it appears to be highly viscous, the apparent viscosity increases to a maximum upon storage or aging for 24 to 36 hours. The apparent viscosity of the aged composition is about 2000 poises at 20° C., the cone penetration value is 342.5 mm. at 25° C. and the specific gravity is 0.92 at 20° C.

An emulsion is prepared using either the freshly cooled or the aged composition by agitating it with an equal weight of water. As stated hereinbefore the inversion point of the emulsion of this example is approximately 35 percent water, based on the weight of the emulsion. The emulsion so formed is stable so that after standing quiescently for 24 hours there is little or no separation of the components. In this form, the composition is stored and shipped in suitable containers. It is applied to the air filter base by spraying or dipping, and the excess emulsion is drained from the filter base. If desired, the filter may be shaken to assist in ridding it of excess emulsion. The coated filter is exposed to a drying atmosphere and the water evaporates readily from the emulsion, leaving a film of the thickened soluble mineral oil adhesive coated on the baffles of the air filter base. The filter is now ready to be placed in service. After the excess emulsion has been drained and the coated filter is exposed to the atmosphere there is no tendency for the emulsion or adhesive to drip from the filter.

The air-borne dust particles adhere to the adhesive in service. The adhesive is tacky and the particles are readily wetted by the adhesive, and the filter of this example and of the present invention exhibits a high degree of dust acceptance, that is, the particles stick readily to the adhesive-coated filter surfaces. Also, the adhesive of this example and of the present invention exhibits no tendency to drip from the filter at temperatures up to 66° C. (150° F.), which is as high as is normally encountered in use.

After a period of use the filter accumulates dust and should either be discarded or reconditioned. The more economical procedure is to recondition the filter, and the filter of this example and of the present invention possesses the advantage that it is readily and thoroughly cleaned. To accomplish this, water, either warm or co'd, is simply flowed upon the filter. The adhesive readily washes away in the form of an emulsion and carries the dirt away with it so that in effect it also acts as a detergent. The filter base is then dried and recoated with emulsified adhesive.

The filter of this example performs well in the test procedure described in a paper entitled "Rating, Selection and Use of Panel Type Air Filters" by Carl B. Rowe, published in "Heating and Ventilating" for January, 1951. In such a test, the resistance to air flow of a clean two-inch thick metal air filter of the impingement type, measured at an air velocity of 350 feet per minute, was 0.105 inch of water. The total amount of dust applied to the filter was 130 grams per square foot of filter ingress surface. The average efficiency was 89.8 percent and the maximum efficiency was 93 percent.

As an alternative procedure for this example, the heated adhesive composition is cooled and the emulsion is formed simultaneously in a single operation. To 50 parts of water is slowly added with agitation an equal weight of the hot adhesive, the temperature of the latter being 75° C. The result is an emulsion at a temperature of 42° C. The emulsion is applied to a filter base, and after evaporation of the water, results in an adhesive which exhibits no tendency to drip from the filter base.

As an additional procedure, the adhesive and water are both heated to an elevated temperature and mixed together with agitation, and the emulsion so formed is allowed to cool slowly. The emulsion is suitable for application to the filter base in the manner described hereinbefore.

*Example 2*

| | Parts by weight |
|---|---|
| Hydrogenated castor oil | 2 |
| Sorbitan monopalmitate | 3.5 |
| Sorbitan monolaurate polyoxy-alkylene derivative | 3.5 |
| Dioctyl sodium sulfosuccinate | .5 |
| Solvent refined mineral oil (viscosity SUS 305 at 38° C.) | 90.5 |

The sorbitan monopalmitate is the product sold under the trade-mark "Span 40" and the sorbitan monolaurate polyoxy-alkylene derivative is the product sold under the trademark "Tween 20." The ingredients are stirred together and heated at a temperature of 100° C. until a clear solution is formed. The temperature is adjusted to 90° C. and the composition is then rapidly cooled as described in connection with Example 1. The apparent viscosity of the cooled composition is 310 poises at 26° C. The composition is mixed with an equal weight of water, and a stable oil-in-water emulsion is thereby formed. Application to the filter base is by the same process as described in connection with Example 1. After the water has evaporated from the emulsion on the filter surfaces, an excellent dust-catching adhesive remains which exhibits no drip at temperatures up to 66° C. This adhesive is readily washed off of the filter by running water, either warm or cold upon it.

*Example 3*

| | Parts by weight |
|---|---|
| Mineral oil (viscosity SUS 305 at 38° C.) | 75 |
| Petroleum sulfonate | 15 |
| Potassium abietate | 3 |
| Sulfonated castor oil | 1 |
| Diethylene glycol monobutyl ether | 1 |
| Water | 5 |
| Polyethylene (molecular weight 18,000 to 20,000) | 2 |

The mineral oil is a conventionally refined oil sold by Pure Oil Company and called Gulf Coastal Pale Oil No. 300. The petroleum sulfonate is that sold by the Pennsylvania Refining Company under the trademark "Petrosul." The polyethylene is that sold by Union Carbide and Carbon Corporation, Bakelite Division, and designated as DYNH grade.

The polyethylene is mixed with 4 times its weight of the mineral oil and the mixture is heated at a temperature of approximately 130° C. with agitation until a clear solution is obtained. The remainder of the mineral oil and the other ingredients are then added and the composition is maintained at approximately 100° C. with agitation until a clear solution is obtained. The solution is then rapidly cooled by a procedure similar to that described in connection with Example 1, the cooling being stopped at a temperature of 35° C. to 50° C. A thixotropic adhesive is obtained. For application to the filter base, it is mixed with an equal weight of water and the mixture thoroughly emulsified. The emulsion is applied to the filter base by dipping or spraying as described in connection with Example 1, and the water is allowed to evaporate from the emulsion coating on the filter surfaces. The resulting adhesive is tacky and exhibits excellent dust-catching properties, and does not drip from the filter at temperatures up to 66° C.

*Example 4*

| | Parts by weight |
|---|---|
| Polyethylene | 2 |
| Soluble mineral oil | 98 |

The polyethylene is sold as A–C Polyethylene No. 7 by the Semet-Solvay Division of Allied Chemical and Dye Corporation and is reported by that company to have a molecular weight of approximately 2100, and a melting point of 102° C. to 106° C. This polyethylene exhibits a Furol viscosity of 250 seconds at 140° C. The soluble mineral oil in this and the following examples is the same as that used in Example 1. The polyethylene and oil are heated in a jacketed kettle at 110° C. until the polyethylene dissolves. The hot solution is then rapidly cooled as in Example 1 by contacting as a thin layer on a cooling drum and the cooling controlled so that the thickened composition leaving the roll is at a temperature of approximately 35° C. The composition is a soft plastic fluid with an apparent viscosity of about 500 poises at 20° C. An emulsion is formed with an equal weight of water and the emulsion is conveniently applied to air filters. The adhesive film remaining after the water has been evaporated is efficient in catching dust and is readily removable with running water.

Results substantially equivalent to those obtained with this example are obtained by using as the thickener 3 parts of A–C polyethylene No. 6 having an average molecular weight of 2100 and a melting point of 97° C. to 100° C.; also using as the thickener 3 parts of the DXL–4 grade of polyethylene sold by Union Carbide and Carbon Corporation, the latter having an average molecular weight of 4000 and a viscosity of 5.2 poises at 130° C.

*Example 5*

| | Parts by weight |
|---|---|
| Microcrystalline wax | 3 |
| Soluble mineral oil | 97 |

The microcrystalline wax has a melting point of 85° C. to 88° C. The ingredients are stirred together and heated at 100° C. to form a solution which is then rapidly cooled to 35° C. by a procedure similar to that described in connection with Example 1. The product has an apparent viscosity of 500 poises and is applied to a filter base in the manner which has been described, after which the water evaporates from the emulsion. The resulting filter has properties substantially similar to those of the filter described in connection with Example 1.

*Example 6*

| | Parts of weight |
|---|---|
| Lithium stearate | 6 |
| Soluble mineral oil | 94 |

In this example the lithium stearate is used as a dry powder. The lithium stearate and a portion of the oil equal to four times its weight are heated together in a jacketed kettle with agitation at about 135° C. until the lithium stearate becomes dissolved and the composition becomes substantially transparent. The remainder of the oil is then added and agitation continued while maintaining the temperature at 90° C. until a uniform clear solution is obtained. The hot solution is then rapidly cooled on a cooling roll as described in connection with Example 1. A clear, amber-colored, homogeneous, highly thixotropic fluid adhesive is obtained, which exhibits an apparent viscosity of 600 poises at 25° C. It forms an excellent filter adhesive and when agitated with an equal weight of water forms a stable emulsion adapted for application to air filters as described in connection with Example 1.

*Example 7*

| | Parts by weight |
|---|---|
| Estersil | 8 |
| Soluble mineral oil | 92 |

The estersil is a fine dispersion of a substrate having a surface of silica with a coating of butoxy groups attached to the silica. The estersil and five times its weight of the oil are heated together with agitation at 110° C. for one hour to expel the contained air, and are then milled in a homogenizer or other milling apparatus to complete the dispersion. The remaining portion of the oil is then added, the milling is repeated, and the composition is then allowed to cool and thicken. The apparent viscosity of the thickened oil composition is 220 poises at 20° C. An emulsion is formed by agitation with water and applied to the filter base, and the filter may be used and serviced, all as described in connection with Example 1.

As variations in procedure for this example, the mixture may be milled while hot or while cold, or it may be allowed to cool during the milling operation.

*Example 8*

| | Parts by weight |
|---|---|
| Aluminum tristearate | 8 |
| Soluble mineral oil | 92 |

The ingredients are heated and agitated together at a temperature of 100° C. until a clear solution is formed. This is rapidly cooled by the same procedure as described in connection with Example 1. The resulting cooled composition has an apparent viscosity of 400 poises at 25° C. It is mixed with an equal weight of water and the mixture agitated to form an emulsion. Such emulsion is applied to a filter base by the same procedure as described in connection with Example 1. After evaporation of the water from the emulsion, an excellent tacky adhesive remains upon the filter surfaces, which does not drip at temperatures up to 66° C. This adhesive, also, readily washes from the filter by flowing water upon it.

*Example 9*

| | Parts by weight |
|---|---|
| Barium stearate | 2 |
| Soluble mineral oil | 98 |

The barium stearate and one-fifth of the soluble mineral oil are heated together at a temperature of 150° C. with agitation until a clear solution is formed. The remainder of the oil is added with agitation until thorough mixture is obtained, and the temperature is adjusted to approximately 100° C. The solution is then allowed to cool to room temperature during which it forms a clear gel. The gel is milled in a roll mill, and the apparent viscosity of the milled composition is 350 poises at 25° C. An equal weight of water is mixed with the composition and an emulsion is formed. The emulsion is applied to a filter base in the manner described in connection with Example 1. After evaporation of the water, there remains on the filter a tacky film of adhesive which does not drip at temperatures up to 66° C.

*Example 10*

| | Parts by weight |
|---|---|
| Calcium stearate | 4 |
| Soluble mineral oil | 96 |

The calcium stearate and one-fifth of the soluble mineral oil are heated together at 150° C. with agitation until a clear solution is formed. The remainder of the oil is added and thoroughly mixed with the solution. The temperature of the resulting solution is adjusted to approximately 100° C., and the solution is rapidly cooled by a procedure similar to that described in connection with Example 1. The resulting thickened composition has an apparent viscosity of 385 poises at 25° C. An emulsion is formed with an equal weight of water, and the emulsion applied to a filter base as described in connection with Example 1. After evaporation of water, there remains a tacky adhesive which shows no evidence of drip at temperatures up to 66° C.

By the present invention, a filter adhesive is provided which does not drip from the filter base, even when used at elevated temperatures. In this adhesive, the thickener is uniformly dispersed in the self-emulsifiable oil. This is true in the emulsion which is made with water for application to the filter base, and also in the adhesive which remains after the water has evaporated from the emulsion. The emulsion is readily applied to the filter base by dipping or spraying. The adhesive remaining after evaporation of water does not drip and it is tacky and wets the air-borne particles, whereby it exhibits a high degree of dust acceptance. When the adhesive has become dust-laden, it is readily removed from the filter base by the simple operation of flowing water upon it, and a new coating of adhesive is readily applied in the form of an emulsion.

Invention is claimed as follows:

1. A gas filter comprising a gas-pervious filter base and a dust-catching adhesive on the surfaces of said filter base, said adhesive comprising a self-emulsifiable mineral oil containing dispersed therein an oleophilic thickener for said oil, said thickener being present in an amount sufficient to impart a non-dripping character to said adhesive.

2. A dust-catching adhesive for gas filters comprising a self-emulsifiable mineral oil containing dispersed therein an oleophilic thickener for said oil in an amount sufficient to impart a non-dripping character to said adhesive.

3. A gas filter comprising a gas-pervious filter body and a dust-catching adhesive on the surfaces of said filter body, said adhesive comprising a self-emulsifiable mineral oil containing dispersed therein an oleophilic thickener for said oil, said thickener being present in an amount sufficient to impart a non-dripping character to said adhesive, and wherein said adhesive is readily emulsifiable and removable by water at room temperature.

4. A dust-catching adhesive for gas filters comprising a self-emulsifiable mineral oil containing dispersed therein an oleophilic thickener for said oil in an amount sufficient to impart a non-dripping character to said adhesive, said adhesive being characterized in that it is readily emulsifiable and removable by water at room temperature.

5. An oil-in-water emulsion which may be applied to a gas filter and which will upon evaporation of water therefrom form a filter adhesive which is readily emulsifiable and removable by water at room temperature, which comprises a self-emulsifiable mineral oil, an oleophilic thickener for said oil, and water.

6. A gas filter according to claim 3 wherein said self-emulsifiable mineral oil is comprised of a major proportion of mineral oil and a minor proportion of an aliphatic emulsifying agent.

7. A dust-catching adhesive according to claim 4 wherein said self-emulsifiable mineral oil is comprised of a major proportion of mineral oil and a minor proportion of an aliphatic emulsifying agent.

8. An oil-in-water emulsion according to claim 5 wherein said self-emulsifiable mineral oil is comprised of a major proportion of mineral oil and a minor proportion of an aliphatic emulsifying agent.

9. A dust-catching adhesive according to claim 4 wherein said oleophilic thickener is hydrogenated castor oil.

10. A dust-catching adhesive according to claim 4 wherein said oleophilic thickener is polyethylene.

11. A dust-catching adhesive according to claim 4 wherein said oleophilic thickener is microcrystalline wax.

12. A dust-catching adhesive according to claim 4 wherein said oleophilic thickener is lithium stearate.

13. A dust-catching adhesive according to claim 4 wherein said self-emulsifiable mineral oil is comprised of a major proportion of mineral oil and minor proportions of mahogany soap and soda rosin soap, and said oleophilic thickening agent is hydrogenated castor oil.

References Cited in the file of this patent

UNITED STATES PATENTS

| | | |
|---|---|---|
| 2,049,043 | Birkby | July 28, 1936 |
| 2,083,132 | Williams et al. | June 8, 1937 |
| 2,556,722 | Hersberger | June 12, 1951 |
| 2,627,938 | Frohmader et al. | Feb. 10, 1953 |
| 2,653,909 | Frazier | Sept. 29, 1953 |
| 2,698,671 | Kenneth et al. | Jan. 4, 1955 |
| 2,732,356 | Paxton | Jan. 24, 1956 |
| 2,751,039 | Hanly | June 19, 1956 |
| 2,751,040 | Hanly | June 19, 1956 |
| 2,789,093 | Foehr | Apr. 16, 1957 |